July 16, 1957 H. R. DALTON 2,799,609

MAGNETIC TRANSDUCING WEBS AND METHOD OF MANUFACTURE

Filed Jan. 24, 1955

INVENTOR.
HAROLD R. DALTON
BY John J. Rogan
ATTORNEY.

United States Patent Office 2,799,609 Patented July 16, 1957

2,799,609

MAGNETIC TRANSDUCING WEBS AND METHOD OF MANUFACTURE

Harold R. Dalton, Jenkintown, Pa.

Application January 24, 1955, Serial No. 483,656

6 Claims. (Cl. 154—95)

This invention relates to the art of magnetic transducing and in particular it relates to magnetic recording and reproducing webs.

A principal object of the invention is to provide an improved magnetic tape or web for use in signal recording and reproducing systems.

Another object is to provide improved methods of making magnetic webs or tapes wherein the magnetic constituents are efficiently distributed through the thickness of the web or tape.

Another object is to provide a novel magnetic tape and methods of manufacture, whereby the finished tape has a highly smooth surface for contacting with a transducing head, while possessing greater magnetic pigment concentration at that portion of the tape thickness which is adjacent the said head.

In the art of making magnetic recording tape it has been the conventional practice to employ a cellulose acetate film or other smooth surface film material (paper) and apply to the surface of one side of such a film a coating of a magnetic pigment held in a binder of a suitable resin dissolved in a solvent. The resin binder was so chosen that the pigment was held tightly to the film surface after the solvent in the resin had evaporated and was of sufficient cohesive strength such that when the product was used as a tape in a magnetic recorder the pigment would not rub off easily when in contact with the magnetic heads. It has been found that this bonding strength in general can only be attained by having a coating which when dry had a resin-to-pigment ratio of not less than approximately 40/100 parts by weight.

In tape made by the method now in use, it is inherent that a greater concentration of resin remains on the surface of the film than on the underside in contact with the film. This is not desirable as anything tending to separate the magnetic pigment from the most intimate contact with the magnetic heads during recording or playback represents a loss in efficiency.

It is also known that the present method of manufacture produces a surface that is irregular as a result of both the method of application and non-uniform nature of the magnetic pigment. It has not been possible to coat magnetic pigment without showing markings such as surface tension lines in the coating after the solvents have evaporated. Also, after the solvents begin to evaporate and the coating begins to shrink, lack of uniformity in the pigment begins to show up as graininess in the surface.

Accordingly, one of the principal objects of this invention is to make it possible to increase the pigment-to-resin ratio so that the dynamic range, or the ratio of the loudest sound which can be reproduced with a given amount of distortion, to the sound which is just audible over the background noise of the coating, is increased over present products.

A further feature relates to the production of a smoother surface obtained by first casting or coating the magnetic pigment dispersion upon a smooth surfaced drum or other type of smooth surface and subsequently applying the supporting film either from a solvent which can be evaporated to produce a film or as a finished film from a laminating operation. After the film with the magnetic tape coating has been stripped or removed from the drum or other casting surface, it will be found that the magnetic pigment surface has taken on the appearance of the surface to which it had been applied. The smoothness of the surface and the lack of graininess is apparent.

A further feature relates to the production of a magnetic pigment surface which is not covered by a microscopic film or layer of high resin content. The method of the present invention eliminates this high resin layer on its surface for when the magnetic pigment film is finally combined with the supporting film this layer will be on the back side of the magnetic pigment surface.

A further feature relates to the manufacture of a magnetic tape in which the resin-to-pigment ratio is less than 40/100 parts by weight and as low as 20/100 parts by weight.

A still further feature relates to the manufacture of a magnetic tape in which the demagnetization effects are brought under closer control by having two or more layers of magnetic pigment cast upon one another and having different magnetic properties.

Figure 1:
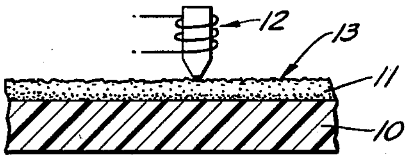
Fig. 1 is a highly magnified section of a web or tape according to the prior art.

Referring to Fig. 1 of the drawing, there is shown in highly magnified form, a cross section of part of a magnetic recording tape produced by known methods. It consists of a backing 10 of a material such as cellulose acetate, or smooth surfaced paper, which has applied thereto on one side in any known manner a coating 11 of a suiable resin dissolved in a solvent and containing the powdered magnetic pigment material. The coating 11 is applied in a liquid or semi-liquid condition and contains a large percent of solid particles. Upon evaporation of the solvents an undesirable compacting of the powdered magnetic material on that portion or stratum of the coating 11 adjacent the bottom of that coating takes place as indicated by the closer stippling in Fig. 1. Since it is the top surface of the film 11 which is to be moved in contact with the recording or reproducing head 12, it is clear that the most efficient distribution of the pigment through the thickness of the coating 11 is not obtainable with the conventional process.

Furthermore, and as pointed out hereinabove, in order to have the required permanent bond between the backing 10 and the coating 11, it has been found necessary that the ratio of resin-to-magnetic pigment in coating 11 be not less than 40/100 parts by weight. Furthermore, with the prior known process, the surface 13 of the finished tape is not perfectly smooth but is irregular, and that surface exhibits even visible graininess and undesirable surface markings such as surface tension lines. On the contrary, the tape or web according to the invention and as illustrated in magnified cross section in Fig. 2 has a head-contacting surface 14 which is perfectly smooth and free from graininess and surface irregularities. In making the tape or web of Fig. 2 according to the invention, the backing 10 is not applied until after the resin and magnetic pigment-bearing material 15 has been preformed as a strippable layer on a highly polished carrier or roll, so that the backing 10 is adjacent to the low density or lightly compacted stratum of the film or coating 15, whereas the stratum of the film or coating 15 containing the more concentrated stratum of the magnetic pigment is located adjacent the head 12. By reason of the particular manner of making the film or coating 15, the surface 14 which contacts the head 12 is perfectly smooth and free from graininess or other surface irregularities.

The invention is not limited to any particular types of resins for either the pigment binder of the coating 15 or supporting film 10, except that they must fulfill the physical requirements of operation. Examples of satisfactory resins that may be used for the pigment binder and the supporting film are as follows: cellulose esters and ethers, polyvinyl esters and ethers, copolymers of vinyl acetate and vinyl chloride, vinylidene chloride polymers and copolymers, acrylate resins, styrene polymers and copolymers, rubbers, and other similar type elastomers, polymeric amides, etc.

The nature of the invention may be understood from the following examples:

*Illustrative Examples 1*

A resin solution in which a magnetic iron oxide is dispersed may consist of the following:

| | Parts by weight |
|---|---|
| Cellulose acetate (56.0 to 56.5 combined acetic acid | 16.0 |
| Acetone | 78.0 |
| Ethanol | 14.0 |
| Methyl phthalyl ethyl glycolate | 2.0 |
| Black iron oxide pigment ($Fe_3O_4$)—coercive force approximately 500 oersteds remanence approximately 2000 gausses (in a field of 1000 oersteds) | 53.0 |

The above ingredients are placed in a ball mill and processed for approximately forty-eight hours or until the iron oxide pigment has been thoroughly dispersed. This dispersion (see Fig. 3) is then coated or cast by any well known coating or casting device 16 upon the surface of a highly polished drum 17 of metal or similar hard non-porous material, so that when the solvent has evaporated there remains a film 15 of approximately 0.005 inch thickness. A second solution of clear cellulose acetate 10 of the following composition is then applied by any well known applicator device 18, so that when the solvents have evaporated from this solution there remains on the drum 17 a unitary composite film of approximately 0.0015 inch in thickness when stripped. This film consists of the elements 10 and 15 (see Fig. 2). The composite film, after stripping, is wound into a roll which can be slit into narrow strips for use as a magnetic recording tape.

| Example of Cellulose Acetate | Parts by Weight |
|---|---|
| Cellulose Acetate (56.0 to 56.5 combined Acetic Acid) | 16.0 |
| Acetone | 78.0 |
| Ethanol | 14.0 |
| Methyl Cellosolve Acetate | 15.0 |
| Methyl Phthalyl Ethyl Glycolate | 3.0 |

It will be understood that the diameter of drum 17 is chosen and its rate of rotation is regulated so as to provide the required drying time for the successive coats. If desired, drum 17 may be heated in any known manner.

Figure 2:
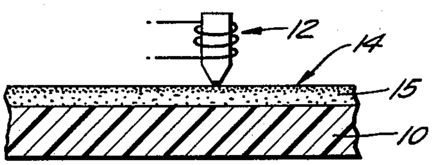
Fig. 2 is a similar highly magnified section of a web or tape according to the invention.
Figures 3, 4:
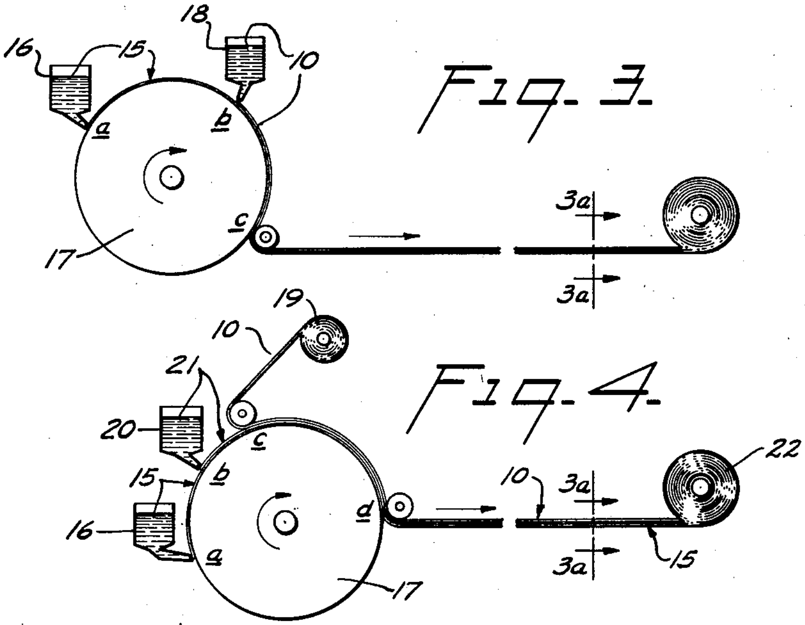
Fig. 3 is a schematic representation of apparatus for practising the method of making a web or tape according to the invention.
Fig. 4 is a schematic representation of apparatus for practising an alternative method of producing a modified magnetic web or tape according to the invention.
Figure 3A:
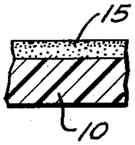
Fig. 3A is a sectional view of Fig. 3 and 4 taken along the line 3A—3A thereof.

Fig. 4 illustrates a modified method of forming the magnetic tape or web of Fig. 2. Instead of applying the backing material 10 to the dried resin-magnetic film 15 by a casting or liquid coating process, the said backing 10 for example of clear cellulose acetate of approximately .001 inch, may be preformed and fed from a supply roll 19. In Fig. 4, the elements which are the same as those of Fig. 3 are designated by the same numerals. For example, the film-forming magnetic pigment resin material 15 is applied to the heated polished surface of the rotary drum 17, for example at the point *a*, and between the points *a* and *b* the said film is dried on the drum surface. At the point *b* there is applied to the dried film 15 from a suitable device 20 a coating of adhesive material 21 in a suitable solvent. Preferably, although not necessarily, this adhesive is of a type which is compatible with the resin that is used for the film 15. At the point *c*, and while the adhesive 21 is still tacky or semi-tacky, there is laid on the adhesive surface the preformed cellulose acetate backing 10. Between the points *c* and *d*, the combined coatings are dried and at the point *d* the dried film is stripped from the polished surface of drum 17, whereupon it is rolled on to a suitable receiving roll 22.

Figure 5:
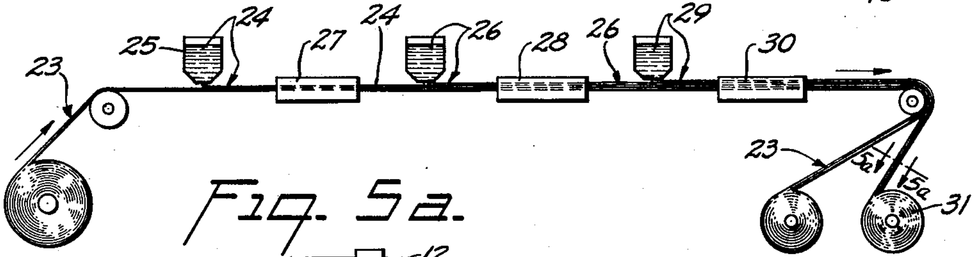
Fig. 5 is a schematic representation of apparatus for practising a further modified method of producing another embodiment of the invention.

Fig. 5 shows a further modification of the invention wherein a smooth surface carrier 23, such for example as an endless web of paper having its surface treated to render it hard and smooth and non-porous, for example by being coated with dried urea formaldehyde resin.

It will be understood, of course, that any other similar hard and smooth surfaced and non-porous belt or carrier may be used. The polyvinyl resin diseprsion of magnetic iron oxide 24 is applied by a suitable applicator device 25 to the upper surface of carrier 23. This resin dispersion may be made as follows:

| | Parts by weight |
|---|---|
| Vinylite resin VYNS (average molecular weight 16,000) (Carbide and Carbon Chemical Corporation) (copolymer of vinyl chloride and vinyl acetate with approximately 90 percent vinyl chloride | 15.0 |
| Tricresyl phosphate | 1.5 |
| Dioctyl sodium sulfosuccinate | 1.5 |
| Methyl ethyl ketone | 175.0 |
| Methyl isobutyl ketone | 30.0 |
| Red magnetic iron oxide pigment ($Fe_2O_3$) coercive force approximately 300 oersteds—remanence approximately 2000 gausses (in a field of 1000 oersteds) | 53.0 |

The above ingredients are placed in a ball mill and processed for approximately forty-eight hours or until the iron oxide pigment has been thoroughly dispersed. The dispersion is then coated or cast upon the surface of a smooth surfaced paper carrier which has been previously coated on its casting surface with the urea formaldehyde resin and from which the magnetic iron oxide coating can be stripped easily after drying.

A second coating 26 of a magnetic pigment of the following composition is then applied over the first coating. It is ball milled as above.

| | Parts by weight |
|---|---|
| Vinylite resin VYNS (average molecular weight 16,000) (Carbide and Carbon Chemical Corporation) (copolymer of vinyl chloride and vinyl acetate with approximately 90 percent vinyl chloride | 15.0 |
| Tricresyl phosphate | 1.5 |
| Dioctyl sodium sulfosuccinate | 1.5 |
| Methyl ethyl ketone | 175.0 |
| Methyl isobutyl ketone | 30.0 |
| Reduced iron alloy—coercive force approximately 40 oersteds—remanence approximately 7000 gausses (in a field of 1000 oersteds) | 45.0 |

The first dispersion 24 is applied in sufficient quantity so that when the solvent has evaporated, for example after passage through drying oven 27, there remains a thickness of film of approximately 0.0005 inch. The second dispersion 26 is applied in sufficient quantity so that when the solvent has evaporated, as for example after passage through drying oven 28, there remains a total thickness of film of approximately 0.0007 inch.

Figure 5A:
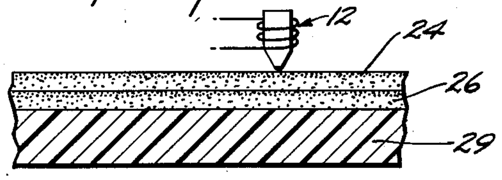
Fig. 5A is a sectional view of Fig. 5 taken along the line 5A—5A thereof, showing a finished web or tape according to the method of Fig. 5.

A third coating 29 of a clear cellulose acetate solution of a composition similar to that shown in Example I is then applied so that when the solvents have evaporated from this solution, for example after passage through drying oven 30, there remains a unitary film of approximately 0.0015 inch in thickness when stripped. The unitary composite film, after stripping, is wound into a roll 31 and can be subsequently slit into narrow strips for use as a magnetic recording tape. Fig. 5A shows a highly magnified section of such tape. Here again the top or outer stratum 24 has a perfectly smooth surface for contacting with the transducing head 12, and the higher concentration of the magnetic pigment is adjacent the head.

While particular materials have been referred to herein, it will be understood that they are given merely by way of example, and various changes may be made therein without departing from the spirit and scope of the invention as will be apparent to those familiar with the art.

What is claimed is:

1. The method of making a magnetic signal-transducing web which is smooth-surfaced on its opposite faces, which faces are free from pigment graininess, which comprises, applying to a substantially non-porous smooth-surfaced carrier a mixture of a film-forming resin with a magnetic pigment, drying said mixture on said carrier, applying to said dried mixture a layer of plastic to form with the dried layer a unitary composite web, and then stripping said composite web from said carrier.

2. The method according to claim 1 in which the plastic layer is applied to said dried mixture while said plastic layer is liquid, and then said plastic layer is dried to form a unitary bond with said dried mixture.

3. The method according to claim 1 in which after said mixture is applied and dried on said carrier there is applied a second similar mixture comprised of a film-forming resin solution and a magnetic pigment, and then said second mixture is dried before applying thereto said plastic layer.

4. The method of making a magnetic signal transducing web of resinous plastic which is substantially non-porous and the opposite faces of which are smooth and substantially entirely free from pigment graininess, which comprises, mixing a film-forming resin solution with magnetic pigment, applying said mixture to a carrier having a smooth dense surface, said pigment tending to settle in said resin prior to drying thereof to form a more dense magnetic stratum in its thickness adjacent the carrier surface than in that portion of its thickness non-adjacent to the carrier surface, drying said mixture, applying a flexible plastic backing to said dried mixture to form therewith a unitary composite web, and then stripping the said web from said carrier to provide a smooth surfaced magnetic transducing web with the said high density magnetic stratum near the exposed surface of said dried mixture.

5. A magnetic signal transducing web, comprising in combination, a flexible plastic backing, and at least two successive films each containing resin and a magnetic pigment, the first film being integrally bonded to the backing and the second film being integrally bonded to the first film to form a unitary composite web, and with a more dense magnetic pigment distribution in each of the films in the portion of the film thickness remote from said backing, said second film having an exterior smooth surface which is substantially entirely free from pigment graininess for contacting a transducing head.

6. A magnetic signal transducing web, comprising, a flexible plastic strip of substantially clear cellulose acetate, and a film comprised of a dried resin solution containing magnetic pigment and integrally bonded to said backing to form therewith a composite unitary strip, the exposed surface of said film being smooth and being substantially entirely free from pigment graininess and having a denser concentration of magnetic particles therein in the portion of the film thickness adjacent said exposed surface than in the portion of the film thickness adjacent said backing.

References Cited in the file of this patent

UNITED STATES PATENTS

| | | |
|---|---|---|
| 2,643,130 | Kornei | June 23, 1953 |

FOREIGN PATENTS

| | | |
|---|---|---|
| 650,675 | Great Britain | Feb. 28, 1951 |
| 651,645 | Great Britain | Apr. 4, 1951 |